United States Patent
Peterson et al.

(10) Patent No.: US 6,864,015 B2
(45) Date of Patent: Mar. 8, 2005

(54) ANTI-ROTATION TERMINAL CONNECTION ASSEMBLY

(75) Inventors: David R. Peterson, Aurora, OH (US); Anthony Quagliato, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 215 days.

(21) Appl. No.: 09/907,062

(22) Filed: Jul. 17, 2001

(65) Prior Publication Data

US 2003/0017391 A1 Jan. 23, 2003

(51) Int. Cl.$^7$ ............................................... H01M 2/08
(52) U.S. Cl. ...................................... 429/182; 439/766
(58) Field of Search ............................... 429/178, 182, 429/183; 411/119, 120; 439/868, 883, 766, 889

(56) References Cited

U.S. PATENT DOCUMENTS

| | | | | |
|---|---|---|---|---|
| 4,936,796 A | * | 6/1990 | Anderson, Jr. | ............... 439/620 |
| 5,442,133 A | * | 8/1995 | Arnold et al. | ................ 174/51 |
| 5,462,453 A | | 10/1995 | Muller | |
| 5,644,830 A | * | 7/1997 | Ladouceur et al. | ........ 29/432.2 |
| 5,707,257 A | * | 1/1998 | Kotajima et al. | ........... 439/762 |
| 5,775,930 A | | 7/1998 | Model et al. | |
| 6,071,153 A | | 6/2000 | Fink et al. | |
| 6,142,813 A | | 11/2000 | Cummings et al. | |
| 6,162,085 A | | 12/2000 | Chugh et al. | |
| 6,168,445 B1 | | 1/2001 | Seutschniker et al. | |
| 6,171,146 B1 | | 1/2001 | Fink et al. | |
| 6,176,746 B1 | | 1/2001 | Morello et al. | |
| 6,179,658 B1 | | 1/2001 | Gunay et al. | |
| 6,203,364 B1 | | 3/2001 | Chupak et al. | |
| 6,210,186 B1 | | 4/2001 | Fink et al. | |
| 6,213,795 B1 | | 4/2001 | Drescher et al. | |
| 6,247,965 B1 | | 6/2001 | Cummings et al. | |
| 6,250,975 B1 | * | 6/2001 | LaPointe | .................... 439/883 |
| 6,276,960 B1 | | 8/2001 | Schaefer et al. | |
| 6,305,957 B1 | | 10/2001 | Fink et al. | |
| 6,338,651 B1 | | 1/2002 | Svette, Jr. et al. | |
| 6,361,356 B1 | | 3/2002 | Heberlein et al. | |
| 6,379,162 B1 | | 4/2002 | Raypole et al. | |
| 6,383,033 B1 | | 5/2002 | Politsky et al. | |
| 6,406,307 B2 | | 6/2002 | Bungo et al. | |
| 6,416,119 B1 | | 7/2002 | Gericke et al. | |
| 6,422,881 B1 | | 7/2002 | Puhl et al. | |
| 6,485,318 B1 | | 11/2002 | Schoepf | |
| 6,485,337 B2 | | 11/2002 | Hsieh | |
| 6,491,487 B1 | * | 12/2002 | Wojciechowski | ........... 411/181 |
| 6,494,751 B1 | | 12/2002 | Morello et al. | |
| 6,508,666 B1 | | 1/2003 | Francis | |
| 6,527,573 B2 | | 3/2003 | Stein, Sr. et al. | |
| 6,533,611 B2 | | 3/2003 | Morello et al. | |
| 6,537,099 B2 | | 3/2003 | Herlinger et al. | |
| 6,547,605 B2 | | 4/2003 | Daugherty et al. | |
| 6,565,372 B2 | | 5/2003 | Bakker et al. | |
| 6,607,393 B2 | | 8/2003 | Raypole et al. | |
| 2002/0115317 A1 | * | 8/2002 | Delcourt et al. | ............... 439/84 |

OTHER PUBLICATIONS

Illustration of an Assembly Tool Fixture in Generic Public use Since at Least Before Apr. 2000.
Pictures of a Ground Block with Anti–Rotation Bent Tab and Hole Terminal Assembly in Generic Public use Since Before at Least Apr. 2000.
Loose Piece, Plastic Molded Anti–Rotation Wheel of Volkswagen, Germany Dated Apr. 1999 Pictures.

* cited by examiner

Primary Examiner—Gregg Cantelmo
(74) Attorney, Agent, or Firm—David P. Wood

(57) ABSTRACT

An anti-rotation terminal connection assembly wherein the stud, nut and terminal components thereof are co-configured so as to prevent rotation of the terminal as the nut is threaded onto the stud. The nut is provided with a central recess defined by an annular lip so that the nut tightens only against the terminal.

13 Claims, 2 Drawing Sheets

US 6,864,015 B2

ANTI-ROTATION TERMINAL CONNECTION ASSEMBLY

TECHNICAL FIELD

The present invention relates to threaded studs and terminals connected thereto via a nut being threaded onto the stud, and more particularly to an anti-rotation terminal assembly composed of a stud, a terminal and a nut, each of which being mutually co-configured to prevent terminal rotation as the nut is tightly threaded onto the stud.

BACKGROUND OF THE INVENTION

In order to secure a terminal to an article, it is conventional to attach a head of a threaded stud to the article, place a circular eyelet of a terminal onto the stud, then thread a nut tightly onto the stud so as to secure the terminal to the stud. The stud serves as an electrical conductor between the terminal and the article.

An example of the foregoing is shown at FIGS. 1A and 1B, wherein a threaded stud 10 has a head 12 which is welded 14 to an automobile frame 16. In this application, the stud serves as a ground connection to the automobile frame. A terminal 18 has a circular eyelet 20, wherein the eyelet is placed onto the stud. In this application, the terminal is connected by a wire 22 to the negative side of a battery. A nut is then threaded onto the stud and thereupon tightened so as to secure an electrical connection between the terminal and the stud.

While the conventional system of a stud, a nut and a circular eyelet terminal works well to provide a good electrical connection between the terminal and an article connected to the stud, there is an inherent problem associated with rotation of the terminal as the nut is tightened. While in some applications, this rotation is a mere annoyance, there are situations where this can be problematic, as for example when rotation may bring the terminal into close proximity with a conductor, or when rotation may place a strain on the wire.

Accordingly, it would be highly desirable if somehow the terminal could be prevented from rotating as the nut is threaded onto the stud.

SUMMARY OF THE INVENTION

The present invention is an anti-rotation terminal connection assembly wherein the stud, nut and terminal components thereof are co-configured so as to prevent rotation of the terminal as the nut is threaded onto the stud.

The stud has a threaded shank and a head having a base. The stud is provided with an asymmetrically shaped boss member (asymmetrical with respect to the shank) located at the base, preferably in the form of a polygonally shaped nut (by "polygonal" is meant having three or more sides) which may be integrally formed of the stud, be screwed onto the stud or be otherwise attached thereto. The terminal has an eyelet which has an asymmetrical shape complementary relative to the asymmetrical shape of the boss member. The nut is provided with a central recess defined by an annular lip.

In operation, the stud is secured to an article in the usual way, as for example by welding to an electrically conductive article. The eyelet of the terminal is placed onto the shank so as to receive the boss member and rest upon the base. The interferingly cooperative asymmetrical shapes of the boss member and the eyelet prevent the terminal from rotating relative to the stud. The nut is then threaded onto the shank, wherein the central recess receives the boss member and the annular lip has a perimeter sufficiently large so that it presses upon the terminal without pressing upon the boss member.

Accordingly, it is an object of the present invention to provide a terminal connection assembly including a stud, a nut and a terminal, wherein the terminal is prevented from rotating with respect to the stud when the nut is tightened onto a threaded shank of the stud.

This and additional objects, features and advantages of the present invention will become clearer from the following specification of a preferred embodiment.

DESCRIPTION OF THE PREFERRED EMBODIMENT

Figure 1A:
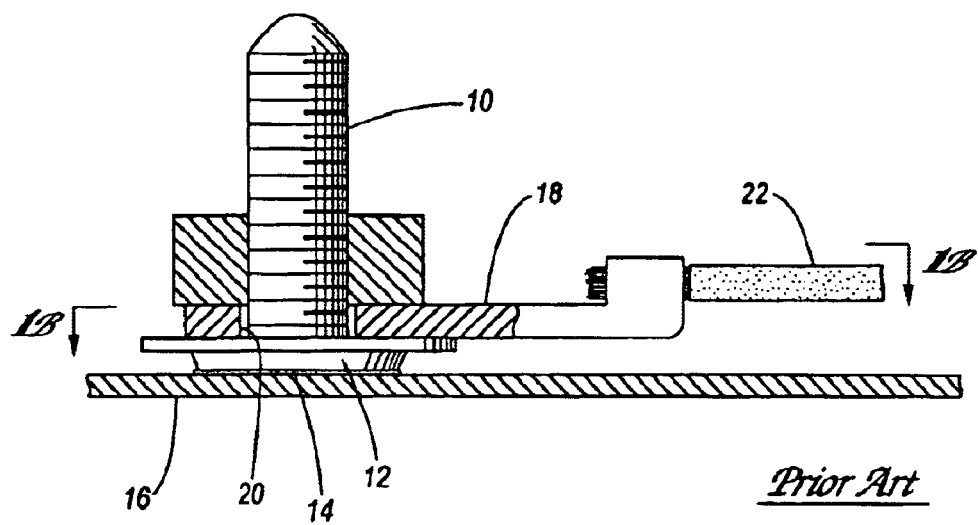
FIG. 1A is a partly sectional side view of a prior art terminal connection assembly shown in operation with respect to an article.
Figure 1B:
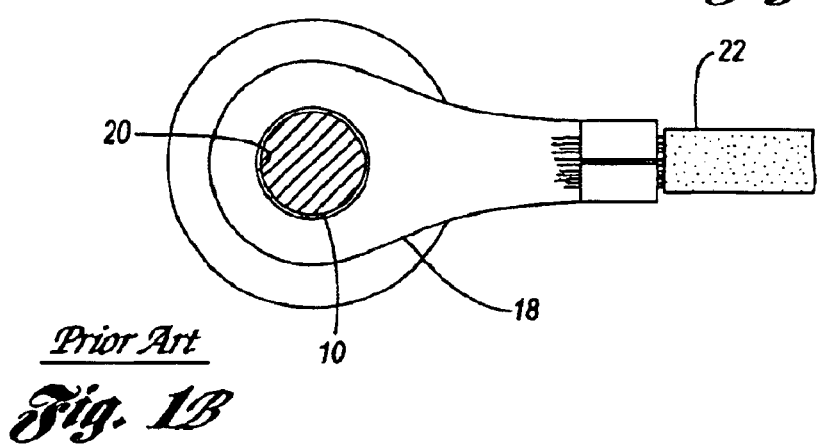
FIG. 1B is a partly sectional view, seen along line 1B—1B in FIG. 1A.
Figure 2:
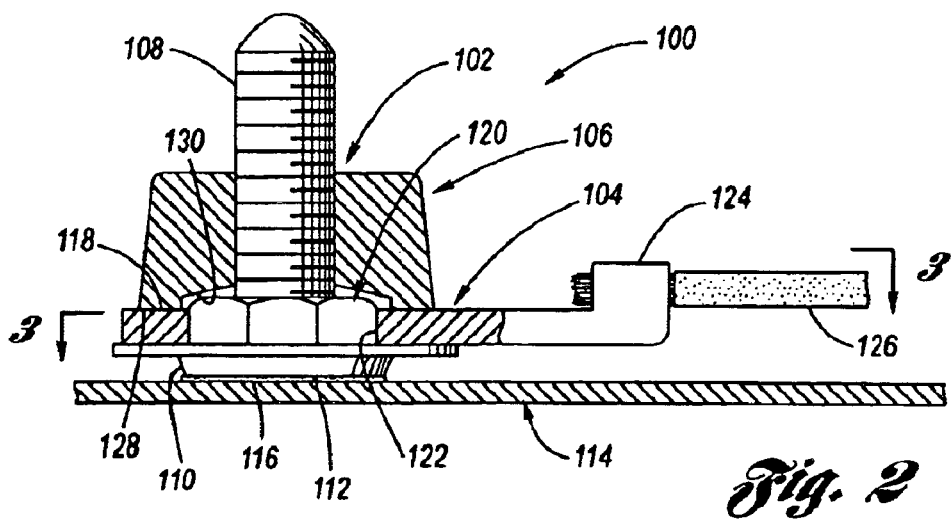
FIG. 2 is a partly sectional side view of an anti-rotation terminal connection assembly according to the present invention, shown in operation with respect to an article.
Figure 3:
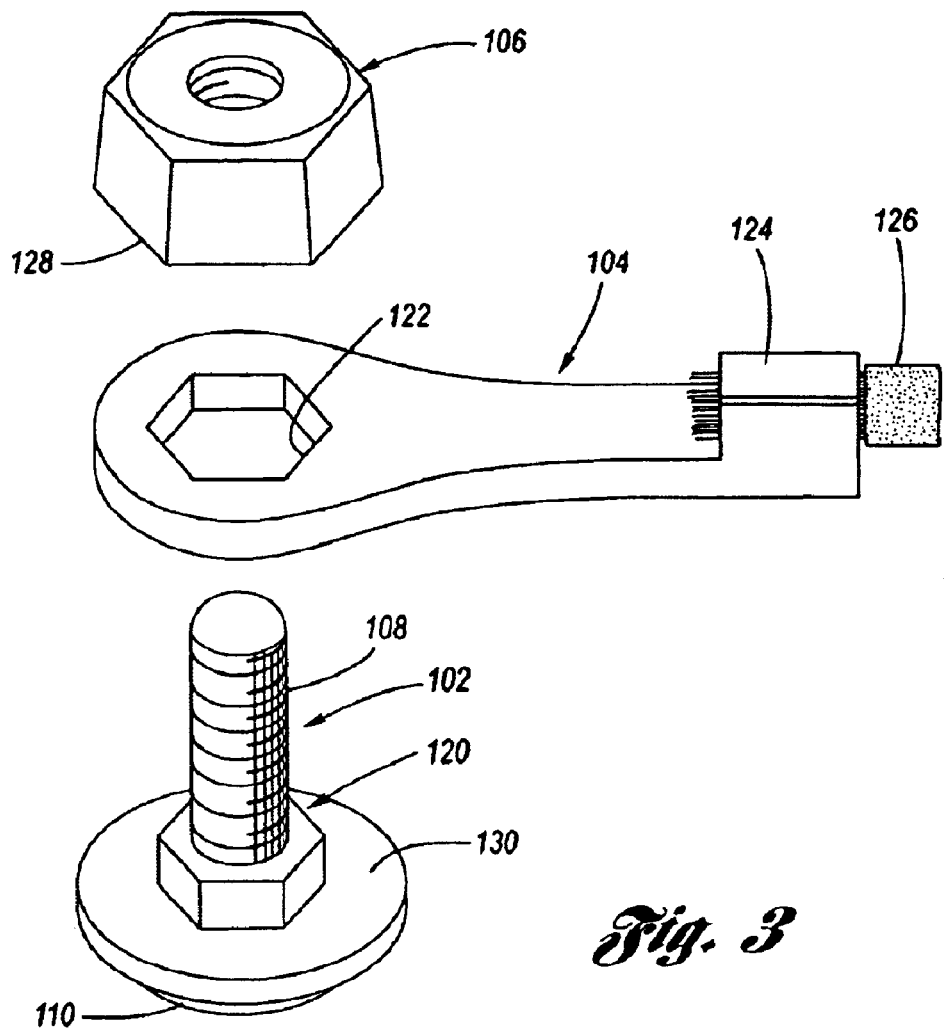
FIG. 3 is an exploded perspective view of the anti-rotation terminal connection system according to the present invention.
Figure 4:
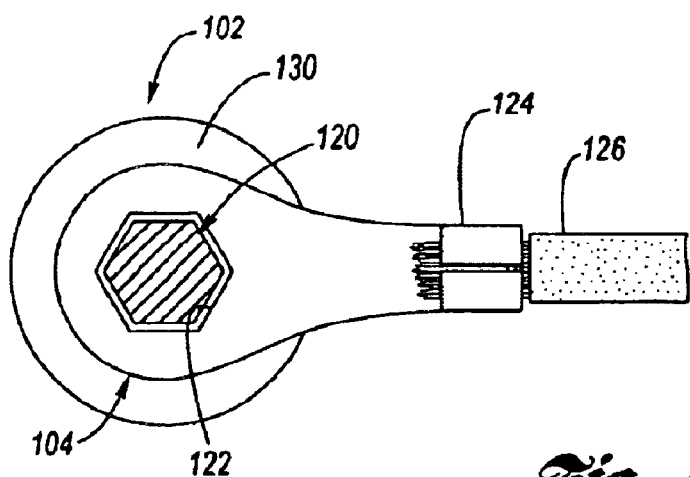
FIG. 4 is a partly section view seen along line 4—4 of FIG. 3.

Referring now to the Drawing, FIGS. 2 through 4 depict an example of an anti-rotation terminal assembly 100 according to the present invention. The anti-rotation terminal assembly 100 includes a stud 102, a terminal 104 and a nut 106, wherein each of these components is co-configured to provide anti-rotation of the terminal as the nut is threaded tightly onto the stud, wherein the nut presses upon only the terminal.

The stud 102 has a threaded shank 108 which is connected, preferably integrally, with a head 110. The head has an external lower surface 112 for being connected to an electrically conductive article 114, as for example by a weld 116. An example of an article 114 is a frame component of an automobile, wherein the stud is being used to provide a ground connection. The head has a flat base 118 which serves as a surface upon which the terminal 104 rests.

At the base 118 and adjacent the shank 108 is an asymmetrically shaped boss member 120 which is asymmetrical with respect to the shank. A preferred asymmetrical shape of the boss member 120 is a polygon (a hexagon being shown by way of preference), wherein the boss member has a thin, nut-like configuration (thin, meaning on the order of, or a little more than, the thickness of the terminal) The boss member can be configured in any manner to provide asymmetry. For example at least one nib on the shank generally adjoining the base 118, or at least one slot formed into, and along the length of, the shank. In these examples, the boss member would constitute a portion of the shank adjacent the base inclusive of the one or more nibs, or slots, as the case may be. The boss member 102 may be formed integrally with the stud, be threaded tightly upon the shank 108 (wherein the boss member is nut-like in configuration), or may be attached to the stud by any suitable modality, as for example by an adhesive.

The terminal 104 has an eyelet 122 which has an asymmetrical shape that is complementary to that of the boss member 120. For example, for a polygonally shaped boss member, the eyelet has a corresponding polygonal shape which is just large enough to snuggly receive the boss member when the terminal lies flatly on the base 118. The drawings depict in this regard a preferred exemplification wherein the boss member and the eyelet each have an hexagonal shape. For another example wherein the boss member is in the form of the shank plus one or more nibs, the eyelet would be circular and include one or more notches into which is respectively received the one or more nibs when the terminal lies flatly on the base. For yet another example wherein the boss member is in the form of the shank plus one or more slots, the eyelet would be circular and include one or more nibs for being respectively received into the one or more slots when the terminal lies flatly on the base.

The term "terminal" as used herein is broad in meaning, for example including a buss bar or a wire terminal/conductor buss.

In a preferred form of the terminal 104, a wire crimp 124 is provided for electrically interconnecting a wire 126 thereto. An example of an electrical connection of the terminal 104 via the wire 126 is to the negative terminal of a battery of an automobile.

The nut 106 is threadable onto the threaded shank 108 and has, preferably, an hexagonal shape for being engaged with a wrench or other similarly functioning tool. The nut 106 has an annular lip 128 at the perimeter thereof and a generally concave central recess 130 located concentric with respect to the annular lip.

In operation, the stud 102 is electrically connected to an electrically conductive article 114 in the usual way, as for example by welding. The eyelet 122 of the terminal 104 is placed onto the shank 108 so as to lie flatly on the base 118 while receiving therein the boss member 120 such that the terminal is unable to rotate with respect to the stud because of an interference generated between the asymmetrical, complementary shapes of the boss member and the eyelet. The nut 106 is then threaded onto the shank, wherein the central recess 130 receives the boss member and the annular lip 128 has a perimeter sufficiently large so that it presses upon the terminal without pressing upon the boss member. As a result, a good electrical connection between the terminal and the article is provided by the stud and nut, wherein the tightening of the nut does not cause rotation of the terminal with respect to the stud.

It is to be understood that the complementary asymmetrical shape of the boss member and the eyelet serves as an orientation mechanism of the terminal relative to the stud. For example, an hexagonal boss member would provide a limitation of orientation of the terminal with respect to the stud to plus or minus sixty degrees rotationally about the shank.

It is to be further noted that the boss member may be used with a conventional circular eyelet terminal, provided the eyelet is sufficiently large to receive thereinside the boss member.

Finally, an advantage of the present invention resides in the fact that no special tools are required for its implementation. Other anti-rotation remedies, as for example starwashers or two-piece heat treaded terminals, require additional tools/parts besides the stud, nut and terminal.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An anti-rotation terminal connection assembly, comprising:
    a stud having a base and a threaded shank connected thereto;
    a boss member connected with said stud at a location substantially adjoining said shank and said base, said boss member having a predetermined non-circular shape;
    a terminal having an eyelet, said eyelet having a non-circular shape complementary to said non-circular shape of said boss member, wherein said eyelet receives said boss member when said terminal lies on said base, and wherein an interfering relation between said boss member and said eyelet prevents rotation of said terminal about said shank; and
    a nut threadably engageable on said shank;
    wherein with said terminal lying on said base, said nut abuts said terminal to thereby electrically connect said terminal to said stud;
    wherein said non-circular shape of said boss member and said eyelet comprises a polygonal shape;
    wherein said nut has a perimeter, said nut having an annular lip formed at said periphery, wherein said lip only abuts said terminal when said nut is tightly threaded on said shank.

2. The anti-rotation terminal connection assembly of claim 1, wherein said nut has a central recess concentric in relation to said annular lip.

3. The anti-rotation terminal connection assembly of claim 2, wherein said central recess has a concave shape.

4. The anti-rotation terminal connection assembly of claim 3, wherein said terminal has a terminal thickness, and wherein said boss member has a boss member thickness substantially similar to said terminal thickness.

5. The anti-rotation terminal connection assembly of claim 4, wherein said polygonal shape comprises an hexagonal shape.

6. An anti-rotation terminal connection assembly, comprising:
    a stud having a base and a threaded shank connected thereto;
    a boss member connected with said stud at a location substantially adjoining said shank and said base, said boss member having a polygonal shape concentrically disposed with respect to said shank;
    a terminal having an eyelet, said eyelet having a polygonal shape complementary to said polygonal shape of said boss member, wherein said eyelet receives said boss member when said terminal lies on said base, and wherein an interfering relation between said boss member and said eyelet prevents rotation of said terminal about said shank; and
    a nut threadably engageable on said shank, said nut having an annular lip formed at a periphery thereof;
    wherein when said terminal lies on said base, said nut abuts only said terminal as said nut is tightened on said shank to thereby electrically connect said terminal to said stud.

7. The anti-rotation terminal connection assembly of claim 6, wherein said nut has a central recess concentric in relation to said annular lip.

8. The anti-rotation terminal connection assembly of claim 7, wherein said central recess has a concave shape.

9. The anti-rotation terminal connection assembly of claim 8, wherein said polygonal shape comprises a hexagonal shape.

10. The anti-rotation terminal connection assembly of claim 6, wherein said terminal has a terminal thickness, and wherein said boss member has a boss member thickness substantially similar to said terminal thickness.

11. The anti-rotation terminal connection assembly of claim 9, wherein said nut has a central recess concentric in relation to said annular lip.

12. The anti-rotation terminal connection assembly of claim 11, wherein said central recess has a concave shape.

13. The anti-rotation terminal connection assembly of claim 12, wherein said polygonal shape comprises an hexagonal shape.

* * * * *